Nov. 24, 1970 C. C. CUTLER ET AL 3,543,237

PATTERN RECOGNITION APPARATUS AND METHOD

Filed July 29, 1966 2 Sheets-Sheet 1

INVENTORS C. C. CUTLER
B. JULESZ
K. S. PENNINGTON

BY Roderick B. Anderson
ATTORNEY

PATTERN RECOGNITION APPARATUS AND METHOD

Filed July 29, 1966 2 Sheets-Sheet 2

United States Patent Office 3,543,237
Patented Nov. 24, 1970

3,543,237

PATTERN RECOGNITION APPARATUS AND METHOD

Cassius C. Cutler, Holmdel, Bela Julesz, Warren, and Keith S. Pennington, Basking Ridge, N.J., assignors to Bell Telephone Laboratories, Incorporated, Murray Hill and Berkeley Heights, N.J., a corporation of New York Filed July 29, 1966, Ser. No. 568,892
Int. Cl. G06k 9/08
U.S. Cl. 340—146.3 12 Claims

ABSTRACT OF THE DISCLOSURE

A bundle of optical fibers are mounted at one end in an electromechanical transducer medium, such as a piezoelectric medium, such that each tip of the secured end is exposed. The various optical fibers have different mechanical resonant frequencies; and therefore only certain fibers of the array will vibrate when the transducer is excited by a complex frequency pattern. Beyond the other end of the bundle are a spatial optical filter and a photodetector array. In operation, the optical fibers are excited by applying a complex frequency pattern to the electromechanical transducer and light is directed into the exposed tips of the fiber bundle and thence through the fiber bundle toward the optical filter and the photodetectors. The optical filter, which, illustratively, is a hologram, comprises a record of the different vibration patterns that can be established in the optical fibers by the different frequency patterns that can be applied to the transducer. If the pattern of light impinging on the filter is representative of one of the stored complex frequency patterns, the light will be directed through the filter to one of the photodetectors, the particular photodetector depending on which one of several possible frequency patterns has been used to excite the transducer and hence the optical fibers.

This relates to devices for recognizing complex vibration patterns, and more particularly, to voice recognition devices.

In the paper by R. D. Hawkins, "Vibrating Optic Fibers—A New Technique for Audiofrequency Information Processing and Pattern Recognition" which is included in the book "Optical Processing of Information," edited by D. K. Pollack, C. J. Koester and J. T. Tippett, Spartan Books, Inc., 1963, a device is described which will generate an output electrical signal only in response to a specific complex mechanical vibration pattern. The paper points out that this device is potentially useful for automatic classification of complex signals or events, such as spoken words, spectral signatures of vehicles, the spatial orientation of an environment, or advanced sonar and radar returns. In one example given, the Hawkins device generated an output current only in response to the spoken word "five."

It is clear that the Hawkins pattern recognition device would be much more useful if it could discriminate among a number of different complex vibration patterns. For voice recognition purposes, for example, this would eliminate the need for a separate device for recognizing each of many different words of a vocabulary.

Accordingly, it is an object of this invention to provide apparatus for generating electrical output signals indicative of any of a number of complex frequency patterns.

This and other objects of the invention are attained in an illustrative embodiment thereof comprising a bundle of optical fibers mounted at one end in an electromechanical transducer medium, such as piezoelectric medium. Adjacent the other end of the bundle is a static mask which is opaque to all of the undisplaced locations of the optical fibers. A coherent light source directs light through the bundle toward an array of photodetectors at the other end of the device. A spatial optical filter is located between the static mask and the photodetector array.

The various optical fibers of the device have different mechanical resonant frequencies. Hence, if the electromechanical transducer is excited by a complex frequency pattern, only certain fibers of the array will vibrate. Those fibers that are vibrated direct the light through the static mask onto the optical filter, while the light transmitted by undisplaced fibers is intercepted by the static mask.

In accordance with the invention, the optical filter contains a pattern which is representative of a plurality of complex frequency patterns, such as a plurality of spoken words. If the pattern of light impinging on the filter is representative of one of the stored complex frequency patterns, the light will be directed through the filter to one of the photodetectors. An output signal from any one of the array of photodetectors is indicative of a specific complex frequency pattern of the input energy. For example, one of the photodetectors releases an output in response to the word "one" while other photodetectors respond to other spoken digits which may excite the transducer.

In accordance with one embodiment of the invention, the optical filter is a hologram recording of a Fourier transform of a matrix of photographs each of which is a recording of the light intensity pattern transmitted from the optical fibers through the static mask in response to one specific frequency pattern of the transducer. The filter is made by locating the photograph matrix at the front focal plane of a spherical converging lens with a photosensitive medium at the back focal plane of the lens. Coherent light is directed through the matrix and the lens to the photosensitive medium where it interfers with reference beam light to form a hologram. As is known in the art, imaging in this manner gives a light amplitude distribution at the plane of the photosensitive medium which is a Fourier transform of the light amplitude distribution at the plane of the photograph matrix. As such, the information of each of the photographs is stored over the entire exposed area of the photosensitive medium which, when developed, forms the hologram optical filter.

The developed Fourier transform hologram filter is included in the recognition apparatus with a first lens between the transducer and the filter, and a second lens between the filter and the photodetector array. When a spoken digit excites the transducer, a Fourier transform of the light intensity projected through the static mask is imaged onto the hologram filter. Correlation of the Fourier transformed pattern and the pattern stored on the hologram causes a bright spot to be projected from the hologram onto one of the photodetectors. The photodetectors are arranged in a matrix crresponding to the matrix of photographs used for making the hologram filter. With proper spacing of the various elements to give Fourier transform projections, and proper location of the photodetector array, the location of the excited photodetector corresponds to the location on the original photograph matrix of the photograph of the recognized frequency pattern. In other words, if the photograph made in response to the spoken digit one occupies a first position in the photograph matrix, then a bright spot will be projected on a first position of the photodetector matrix in response to the same spoken digit one.

In accordance with another embodiment of the invention, the optical filter comprises superimposed hologram recordings of the light transmitted through the static mask in response to each of the frequency patterns to be recognized. Each of the hologram recordings is made by directing a reference beam at a photosensitive medium at a different angle. For example, the photosensitive medium is exposed to light transmitted through the static mask in response to the spoken digit one and to a reference beam of a first angle; it is then exposed to light transmitted through the static mask in response to the spoken digit "two" and to a reference beam of a second angle. After the photosensitive medium has been developed to form the superimposed hologram optical filter, it is inserted between the static mask and an array of photodetectors that are arranged at angles corresponding to the angles of the various reference beams used in the hologram formation. Upon correlation of the frequency pattern of the transducer and one of the patterns recorded on the hologram filter, a bright spot will be projected on the photodetector corresponding to the angle of the reference beam that was used in recording that particular frequency pattern. Fourier transform projections may be used in this embodiment, although as will become clearer later, they are not required.

These and other objects and features of the invention will be more fully appreciated from a consideration of the following detailed description, taken in conjunction with the accompanying drawing in which.

Figures 1, 2, 3:
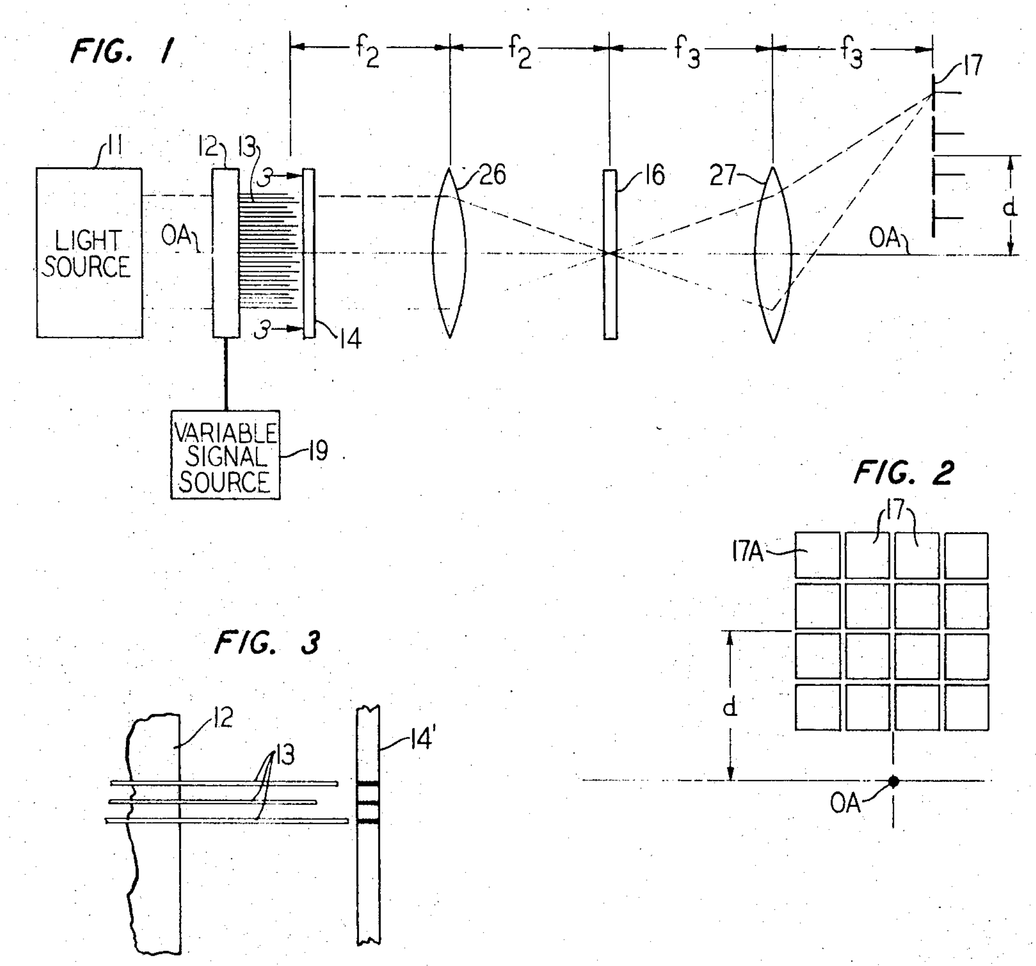
FIG. 1 is a schematic illustration of pattern recognition apparatus in accordance with an illustrative embodiment of the invention.
FIGS. 2 and 3 are enlarged views of parts of the apparatus of FIG. 1.
Figure 5:
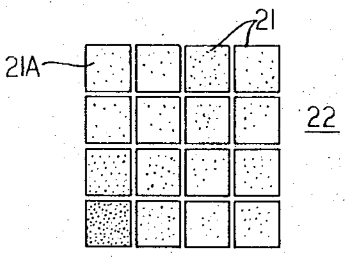
Figure 4:
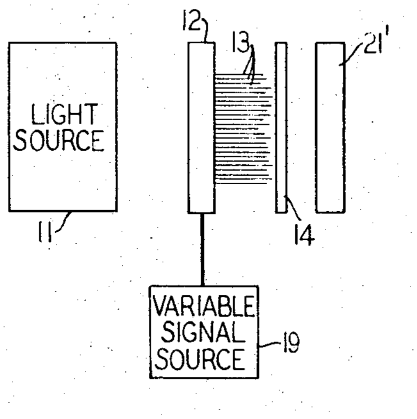
Figure 6:
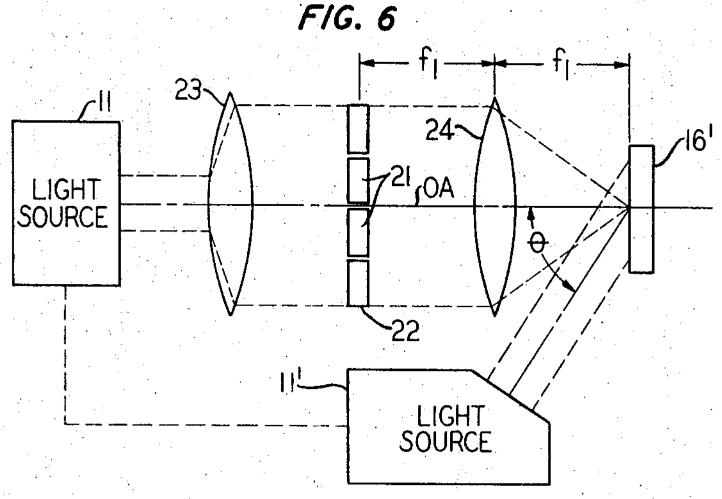
Figure 7:
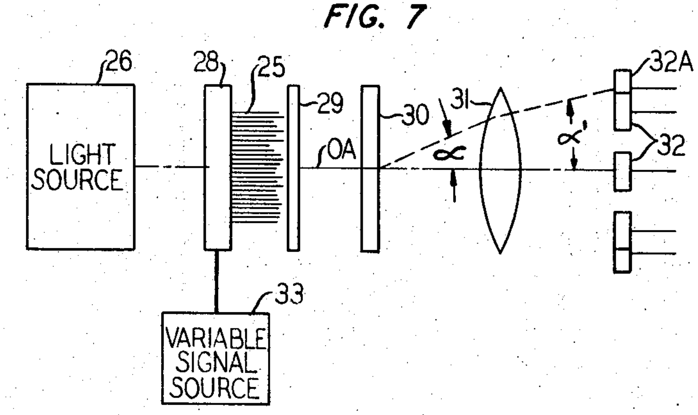
Figure 8:
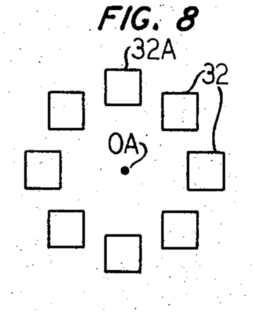
Figure 9:
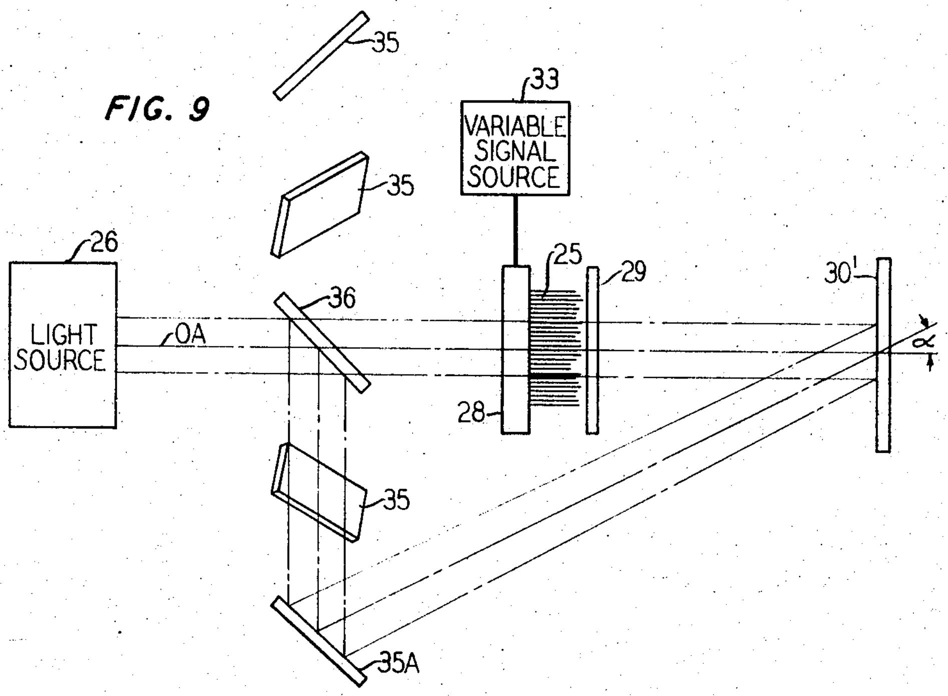

FIGS. 4, 5, and 6 are schematic illustrations of devices for making an optical filter for use in the apparatus of FIG. 1 in accordance with one embodiment of the invention;

FIG. 7 is a schematic illustration of another embodiment of the invention;

FIG. 8 is an illustration of the photodetector array of the embodiment of FIG. 6; and FIG. 9 is a schematic illustration of a device for making an optical filter for use in the apparatus of FIG. 7.

Referring now to FIG. 1 there is shown schematically an illustrative embodiment of a pattern recognition device comprising a coherent light source 11, a transducer medium 12, a bundle of optical fibers 13, a static mask 14, an optical filter 16, and an array of photodetectors 17. The light source projects a beam of coherent light along an optical axis OA through the transducer medium 12 and the optical fiber bundle 13. As is known, optical fibers are flexible elements which are capable of transmitting light without substantial distortion even though they are bent or deflected. One end of the fiber bundle is imbedded in the transducer medium 12 which is preferably made of a piezoelectric material such as quartz.

Connected to the transducer medium 12 is a variable signal source 19 for establishing various frequency patterns in the transducer medium. The purpose of the apparatus of FIG. 1 is to excite specific photodetectors 17 in response to specific frequency patterns from the signal source 19. The frequency patterns may, for example, be electrical representations of specific spoken words such as the numbers "one," "two," etc., which are converted by the transducer to mechanical frequencies. The various optical fibers are shown as being of different lengths to emphasize that they are of different mechanical resonant frequencies. Hence, different optical fibers are vibrated in response to different vibrational frequency patterns in the transducer medium 12.

Prior to operation of the device, the static mask 14 is formed as shown in FIG. 3. Light is transmitted through the fibers 13 to expose an array of spots on a photosensitive medium 14'. The transducer medium 12 is unexcited so that each of the exposed spots represents the undisplaced location of the tip of one of the optical fibers. When the photosensitive medium 14' is developed to form the static mask 14 of FIG. 1, each of the exposed spots is opaque to incoming light. Hence, in operation, the only light transmitted through static mask 14 is that which is transmitted by optical fibers that have been displaced due to vibration by the transducer medium 12.

Light which is transmitted through the static mask 14 in response to a specific frequency pattern will be transmitted through the optical filter 16 as a bright light spot if the light intensity pattern corresponds to a pattern which has been recorded on filter 16. If, for example, the light intensity pattern representative of the spoken word "one" has been recorded on optical filter 16, then a bright spot will be projected to one of the photodetectors 17 in response to the frequency pattern representative of the spoken word "one" in the transducer medium 12.

FIGS. 4, 5, and 6 illustrate the steps of making the optical filter 16 in accordance with one embodiment of the invention. Referring to FIG. 4, a photograph of the light directed through the static mask 14 in response to each of the frequency patterns to be recognized is recorded on a conventional photographic medium 21'. For example, if sixteen patterns are to be recorded, sixteen photographs are made by passing light from source 11 through the fibers 13 and static mask 14, and exposing a different photographic medium 21' for each of the signal frequency patterns transmitted from source 19. The developed photographs 21 are then oriented as shown in FIG. 5 to form a matrix of photographs 22. The various dots on photographs 21 represent the exposure of each photograph to the various optical fibers which were displaced to project light through static mask 14 in response to each of the frequency patterns. For example, photograph 21A is a recording of the light projected by optic fibers through static mask 14 in response to the frequency pattern resulting from the spoken word "one."

A Fourier transform hologram recording of all of the photographs on matrix 22 is made by the apparatus of FIG. 6. Coherent light from a source 11 is projected through a collimating lens 23, the photograph matrix 22, and a lens 24 to a photosensitive medium 16'. Coherent light from source 11' which is phase related with light from source 11 is also projected onto photosensitive medium 16' for the purpose of establishing hologram interference patterns. In the forming of holograms, it is customary to derive the reference beam light from the same source as the subject beam, and so a dotted line between sources 11 and 11' has been included to show that the light quantities are phase related and may be derived from a common source.

The matrix 22 is located at the front focal plane of lens 24 with photosensitive medium 16' located at the back focal plane of the lens; in other words, the matrix and medium 16' are both displaced from the lens 24 by a distance equal to the lens focal length $f_1$ as shown. Under these conditions, as is known, a Fourier transform of the light amplitude at the front focal plane will be projected onto the back focal plane at the photographic medium 16'. As a result, all of the information stored on each of the photographs 21 will be recorded over the entire exposed surface of the photosensitive medium 16'. When the photosensitive medium 16' is developed, a hologram of all of the photographs 21 is made which constitutes the filter 16 of FIG. 1. Fourier transform holograms are described in more detail in the paper "Signal Detection by Complex Spatial Filtering," A. Vander Lugt, IEEE Transactions on Information Theory, vol. IT–10, p. 139, April 1964, and in patent 3,435,244 issued March 25, 1969 to C. B. Burckhardt and K. S. Pennington, and assigned to Bell Telephone Laboratories, Incorporated.

Referring again to FIG. 1, the hologram optical filter 16 is located at the back focal plane of a lens 26 and at the front focal plane of a lens 27. The free end of the optical fiber bundle is located at the front focal plane of lens 26 so that a Fourier transform of any light transmitted through the static mask 14 is projected onto the optical filter 16. In FIG. 1, $f_2$ is the focal length of lens 26, and $f_3$ the focal length of lens 27. If the Fourier transformed light amplitude pattern corresponds to any of the patterns recorded on the filter 16, light will be projected from the filter 16 in the form of a fairly intense beam or light spot. With lens 27 located a distance equal to its own focal length from the filter 16 and from the photodetector array 17 as shown, the projected light from filter 16 will be focused at a predetermined location on the array of photodetectors 17.

If the various lenses 26 and 27 of FIG. 1 and 24 of FIG. 6 do not provide any magnification, then the dimensions of the photodetector array should correspond to the photograph matrix 22 of FIG. 5. However, the photodetector array advantageously is displaced from the optical axis OA by a distance $d$ given by $$d = f_3 \tan \theta \qquad (1)$$

where $f_3$ is the focal length of lens 27, and $\theta$ is the angle with the optical axis at which the reference beam impinges on the photosensitive medium 16' as shown in FIG. 6. Under these conditions, any cross-correlation bright spot projected from filter 16 will impinge on a photoconductor having a location corresponding with that of the photograph matrix of FIG. 5 containing the pattern which has been recognized.

For example, if photograph 21A of FIG. 5 is the recording of the light pattern resulting from the spoken word "one," and if the spoken word "one" drives the transducer 12 of FIG. 1, then a bright spot will be projected from the filter 16 which will impinge on a photodetector 17A of FIG. 2 having a location corresponding with the location of photograph 21A of FIG. 5. Hence, an output from photodetector 17A constitutes a recognition of the spoken word "one" in the apparatus of FIG. 1. Likewise, outputs from each of the other photodetectors 17 indicate a recognition of one of the frequency patterns represented by one of the photographs of FIG. 5, for example, the spoken words "two," "three," etc.

Referring now to FIG. 7, there is shown, for purposes of further illustration, an alternative embodiment of the invention comprising a coherent light source 26 for projecting light through a bundle of optic fibers 25 imbedded in a transducer medium 28, a static mask 29, an optical filter 30, an imaging lens 31 and an array of photodetectors 32. As before, the purpose of the device of FIG. 7 is to actuate a selected photodetector 32 in response to a recognized frequency pattern excited in transducer 28 by a variable voltage source 33. The photodetectors 32 are arranged in a circle as shown in FIG. 8.

Referreing now to FIG. 9, apparatus for making the optical filter 30 of FIG. 7 comprises the light source 26, the transducer 28, the variable signal source 33, the static mask 29, and a photosensitive medium 30' from which the filter is made. Arranged in a circle around the optical axis OA are a plurality of mirrors 35 for directing reference beam light toward the photosensitive medium 30'. Part of the light from source 26 is directed toward one of the mirrors by a beam splitter 36 which may be a partially transparent mirror for permitting part of the light to proceed along the optical axis while deflecting part of the light toward one of the mirrors.

A hologram recording of the light transmitted through static mask 29 in response to each of the frequency patterns from signal source 33 is made by projecting reference beam light from successive mirrors 35. For example, a recording of the frequency pattern of the word one is made by exciting the transducer 28 with the signal representative of the word one and simultaneously directing subject beam light through the fibers 25 and reference beam light from a first mirror 35A. The resulting interference patterns form a hologram recording in photosensitive medium 30' which is representative of the recorded word one. A hologram recording representative of the word two is made in the same manner except that reference beam light is directed from a second mirror 35 to impinge at a different angle on photosensitive medium 30'. In this manner, superimposed holograms of all the light amplitude patterns to be recognized are recorded on the photosensitive medium 30'. When the photosensitive medium is developed, it is replaced in the apparatus of FIG. 7 as filter 30. The criteria for superimposing a plurality of hologram recordings on a single medium are described, for example, in the copending application of K. S. Pennington, Ser. No. 538,368, filed Mar. 29, 1966, and assigned to Bell Telephone Laboratories, Incorporated.

As is known, in the absence of lenses, reconstructed virtual image light will be projected from a hologram at an angle corresponding to the reference beam angle used during recording of the hologram. For example, if the word one is recorded by projecting reference beam light from mirror 35A of FIG. 9 at an angle $\alpha$ with respect to the optical axis OA, then light will be projected from the hologram at angle $\alpha$ if subject beam light is directed against the hologram which is identical to the light of the subject beam during recording. Hence, the photodetectors 32 of FIG. 7 are arranged at angles with respect to the optical axis OA which correspond to the angles at which mirrors 35 of FIG. 9 direct light against the photosensitive medium 30'. Assume for example, that photodetector 32A is oriented at an angle $\alpha'$ shown in FIG. 7 which corresponds with the angle $\alpha$ of FIG. 9. Then if the frequency pattern of the spoken word one drives transducer 28 of FIG. 7, the light amplitude pattern impinging on hologram optical filter 30 will be correlated to the recorded pattern made by the apparatus of FIG. 9, and light will be projected from the filter 30 at an angle $\alpha$ to impinge on photodetector 32A. Imaging lens 31 is included in the apparatus of FIG. 7 to focus the reconstructed light from hologram filter 30 onto the various photodetectors 32. In like manner, the remaining photodetectors 32 are located at angles corresponding to the various mirrors 35 of FIG. 9 so that an output of any specific photodetector 32 is indicative of a recognition of a specific recorded frequency pattern.

From the foregoing it can be seen that the disclosed illustrative embodiments are capable of recognizing a plurality of frequency patterns rather than merely the single pattern as in the Hawkins device. Generally, our invention is based on the correlation of a frequency pattern input with a number of superimposed frequency patterns on an optical filter. Accordingly, numerous modifications and embodiments other than those presented could be used; for example, the hologram recording apparatus of FIG. 9 could include a lens between static mask 29 and medium 30' for giving a Fourier transform of the input with similar Fourier transform lenses used in the recognition apparatus of FIG. 7. Since Fourier transform correlation devices are insensitive to lateral translations of the various elements, such modification could be of possible advantage. The term "photodetector array" as used herein is intended to embrace photoresponsive devices such as vidicons which are capable of indicating the location of light and which could be used instead of the specific photodetector arrays shown. Further, the static mask could take any of the forms shown and described in the Hawkins paper. Various other embodiments and modifications may be made by those skilled in the art without departing from the spirit and scope of the invention.

What is claimed is:

1. Pattern recognition apparatus comprising:

an aray of elongated optical fibers having first and second ends;

the first ends being mounted in a transducer medium for establishing mechanical frequencies in response to an input signal;

means for directing light into the first ends of the optical fibers;

said optical fibers having different characteristic mechanical resonant frequencies, whereby energy in the transducer of different frequency patterns induces vibrations of different optical fibers;

means comprising a static mask for intercepting light from certain of the second ends of the fibers;

said static mask being substantially opaque only at locations corresponding to the undisplaced positions of the second ends of the optical fibers, and being substantially transparent elsewhere, whereby light from optical fibers that are displaced due to mechanical vibrations is not intercepted by the static mask;

a photodetector array;

an optical filter between the photodetector array and the static mask;

said optical filter comprising means for selectively directing light predominantly to one specific location of the photodetector array in response to one specific vibration frequency pattern of the optical fibers and to another specific location of the photodetector array in response to a different specific vibration frequency pattern of the optical fibers.

2. The apparatus of claim 1 wherein:

the optical filter is a hologram recording of a Fourier transform of a matrix of photographs each of which is a photographic recording of the light intensity pattern transmitted from the optical fibers through the static mask in response to one specific frequency pattern of the transducer.

3. The apparatus of claim 2 further comprising:

a first lens included between the transducer and the optical filter;

a second lens included between the transducer and the photodetector array;

the distances from the transducer to the first lens and from the first lens to the optical filter each being substantially equal to the focal length of the first lens;

the distance from the optical filter to the second lens and from the second lens to the photodetector array each being substantially equal to the focal length of the second lens.

4. The apparatus of claim 1 wherein:

the optical filter comprises a plurality of superimposed hologram recordings each of which is a hologram recording of the light intensity transmitted from the optical fibers through the static mask in response to one specific frequency pattern of the transducer.

5. The apparatus of claim 4 further comprising:

means for making the optical filter comprising a source of reference beam light and a photosensitive medium for recoring the light intensity from the optical fibers; and means for directing the reference beam light at the photosensitive medium at a different angle for each of a specific transducer frequency pattern.

6. The apparatus of claim 5 further comprising:

individual photodetectors of the photodetector array each of which are located with respect to the optical filter at one of said different angles.

7. A method for recognizing and discriminating among a plurality of complex frequency patterns of any of a plurality of input signals through the use of apparatus including a bundle of optical fibers of different characteristic mechanical resonant frequencies mounted at one end in a transducer medium with a static mask near the other end of the fibers, said method comprising the steps of:

successively exposing a plurality of first photosensitive media to light directed through the optical fiber bundle and the static mask;

driving the transducer medium with signal energy of a different complex frequency pattern during each exposure of each photosensitive medium;

developing the photosensitive media to make photographic recordings;

arranging the photographic recordings in a matrix;

making a Fourier transform hologram recording of the matrix;

inserting the hologram recording between the optical fiber bundle and a photodetector array;

and directing coherent light through the optical fiber bundle, the static mask, and the hologram recording while driving the transducer medium with signal energy to be recognized.

8. The method of claim 7 wherein the last-mentioned light directing step includes the step of projecting onto the hologram recording a Fourier transform of the light amplitude projected from the free ends of the optical fibers through the static mask.

9. A method for recognizing and discriminating among a plurality of complex frequency patterns of any of a plurality of input signals through the use of apparatus including a bundle of optical fibers of different characteristic mechanical resonant frequencies mounted at one end in a transducer medium with a static mask near the other end of the fibers, said method comprising the steps of:

exposing a photosensitive medium to coherent light directed through the optical fiber bundle and the static mask and simultaneously to phase-related coherent reference beam light, thereby to make a hologram recording;

successively driving the transducer medium with signal energy of different complex frequency patterns;

successively changing the direction of impingement of the reference beam on the photosensitive medium with each successive change of frequency pattern in the transducer;

developing the hologram recording;

inserting the hologram recording between the optical fiber bundle and the photodetector array; and directing coherent light through the optical fiber bundle, the static mask and the hologram recording while driving the transducer medium with signal energy to be recognized.

10. Pattern recognition apparatus comprising:

an array of elongated optical fibers having first and second ends;

the first ends being mounted in a transducer medium for establishing mechanical frequencies in response to an input signal;

means for directing light into the first ends of the optical fibers;

said optical fibers having different characteristic mechanical resonant frequencies, whereby energy in the transducer of different frequency patterns induces vibrations of different optical fibers;

a photodetector array;

an optical filter between the photodetector array and the optical fibers;

said optical filter comprising means for selectively directing light predominantly to one specific location of the photodetector array in response to one specific vibration frequency pattern of the optical fibers and to another specific location of the photodetector array in response to a different specific vibration frequency pattern of the optical fibers.

11. The apparatus of claim 10 wherein the optical filter is a hologram recording of a set of photographs each of which is a photographic recording of the light intensity pattern transmitted from at least those optical fibers that are vibrating in response to one specific frequency patern of the transducer.

12. The apparatus of claim 10 wherein the optical filter comprises a plurality of superimposed hologram recordings each of which is a hologram recording of the light intensity transmitted from at least those optical fibers that are vibrating in response to one specific frequency pattern of the transducer.

References Cited

UNITED STATES PATENTS 3,225,329 12/1965 Rabinow ............ 350—96

OTHER REFERENCES

R. D. Hawkins, "Vibrating Optic Fibers— A New Technique For Audiofrequency Information Processing And Pattern Recognition" from "Optical Processing Of Information, pp. 187–198 by Spartan Books, 1963.

MAYNARD R. WILBUR, Primary Examiner

C. D. MILLER, Assistant Examiner

U.S. Cl. X.R.

350—96